(12) United States Patent
Stiller (10) Patent No.: US 7,209,818 B2
(45) Date of Patent: Apr. 24, 2007

(54) METHOD AND ARRANGEMENT FOR DETECTING A DRIVING STATE

(75) Inventor: Alexander Stiller, Garbsen (DE)

(73) Assignee: Continental Aktiengesellschaft, Hannover (DE)

( * ) Notice: Subject to any disclaimer, the term of this patent is extended or adjusted under 35 U.S.C. 154(b) by 541 days.

(21) Appl. No.: 10/829,323

(22) Filed: Apr. 22, 2004

(65) Prior Publication Data

US 2004/0216020 A1     Oct. 28, 2004

(30) Foreign Application Priority Data

Apr. 22, 2003   (DE) ............................... 103 18 111

(51) Int. Cl.
  *G01M 1/00*   (2006.01)
  *G06F 17/00*   (2006.01)
(52) U.S. Cl. ........................... 701/38; 701/35; 701/48; 702/182
(58) Field of Classification Search .................. 701/1, 701/29, 35, 96, 36, 38, 48, 41, 45, 301; 702/182, 702/183, 185
See application file for complete search history.

(56) References Cited

U.S. PATENT DOCUMENTS

| | | | |
|---|---|---|---|
| 5,189,619 A * | 2/1993 | Adachi et al. ................ 701/96 |
| 5,869,943 A | 2/1999 | Nakashima et al. | |
| 6,366,844 B1 | 4/2002 | Woywod et al. | |
| 6,424,907 B1 | 7/2002 | Rieth et al. | |
| 6,438,464 B1 | 8/2002 | Woywod et al. | |
| 6,498,976 B1 | 12/2002 | Ehlbeck et al. | |
| 6,571,176 B1 * | 5/2003 | Shinmura et al. ........... 701/301 |
| 6,614,343 B1 | 9/2003 | Fennel et al. | |
| 7,126,460 B2 * | 10/2006 | Yamada ...................... 340/435 |

FOREIGN PATENT DOCUMENTS

| | | |
|---|---|---|
| DE | 198 02 241 | 7/1999 |
| DE | 198 30 189 | 11/1999 |
| DE | 198 29 361 | 1/2000 |
| DE | 199 04 219 | 1/2000 |
| DE | 199 18 597 | 11/2000 |
| DE | 100 39 108 | 7/2001 |
| DE | 100 03 739 | 8/2001 |
| DE | 101 03 629 | 12/2001 |
| DE | 100 65 724 | 7/2002 |
| DE | 101 33 409 | 1/2003 |
| DE | 101 35 020 | 2/2003 |
| EP | 1 234 741 | 8/2002 |

* cited by examiner

*Primary Examiner*—Tan Q. Nguyen (57) ABSTRACT

A method determines a driving state from a plurality of driving states sorted in accordance with the degree of danger thereof. In the method, at least one test criterion for at least one driving parameter is allocated to each of the driving states. At least one of the driving parameters is detected and, based on the driving parameter, a test is made to determine if one of the driving states from the plurality of driving states is present. This testing is in a time sequence starting with the most dangerous of the driving states by evaluating the test criterion corresponding thereto.

20 Claims, 6 Drawing Sheets

| Driving Parameter | Travel/Standstill on a Slope | Statistical Travel in a Curve | Dynamic Driving Maneuver |
|---|---|---|---|
| $|x_1|$ | $>K_1$ | $>K_3$ | $>K_6$ |
| $x_2$ | - | - | $>K_7$ |
| $|x_3|$ | $>K_2$ | $>K_4$ | $>K_8$ |
| $x_4$ | - | - | $>K_9$ |
| $a_Q$ | - | $>K_5$ | $>K_{10}$ |

←──────── Test Sequence ────────

METHOD AND ARRANGEMENT FOR DETECTING A DRIVING STATE

CROSS REFERENCE TO RELATED APPLICATION

This application claims priority of German patent application no. 103 18 111.3, filed Apr. 22, 2003, the entire content of which is incorporated herein by reference.

FIELD OF THE INVENTION

The invention relates to a method and an arrangement for detecting a driving state, especially of a motor vehicle. The invention also relates to a digital storage medium.

BACKGROUND OF THE INVENTION

From the state of the art, various methods and arrangements for determining critical driving states are known. German patent publication 199 18 597 discloses a method for reducing the tilt danger of motor vehicles wherein a tilt coefficient of the motor vehicle is continuously determined and compared to a pregiven limit value. When the limit value is exceeded, a steering intervention is automatically initiated which increases with reducing tilt stability. The tilt coefficient is determined via a measurement of the tire contact forces or by measuring signals from which the elevation of the center of gravity of the vehicle and the transverse acceleration at the gravity center can be determined. As an additional measure, a braking intervention can be initiated.

U.S. Pat. Nos. 6,424,907 and 6,438,464 as well as German patent publications 199 04 219, 198 29 361, 101 33 409, 100 65 724 and 100 39 108 all disclose different additional methods and arrangements for determining the critical driving states during driving operation, especially, for determining a tilt tendency.

SUMMARY OF THE INVENTION

In contrast to the above, it is an object of the invention to provide an improved method for detecting a driving state as well as an arrangement for detecting a driving state. It is also an object of the invention to provide a digital storage medium.

The invention makes possible a detection of a driving state from a plurality of driving states. This can take place in that each driving state is assigned a test criterion. For detecting a driving state, a driving parameter is first detected. Based on this driving parameter, the test criteria of the driving states are then evaluated.

According to the invention, this takes place in such a manner that first the test criterion of the driving state, which is classified as the most dangerous, is evaluated. If this test criterion is not satisfied, that is, the most dangerous driving state is not present, the test criterion of the second most dangerous driving state is evaluated based on the driving parameter.

The evaluation of the test criteria therefore takes place in a time-dependent sequence from the test criterion of the most dangerous driving situation to the test criterion of the least dangerous state. With this sequence of data processing, it is ensured that especially dangerous driving states can be detected with the highest priority, that is, that they can be detected especially rapidly.

In accordance with a preferred embodiment of the invention, the method distinguishes, for example, between three different driving states: (i) tilt tendency during a dynamic driving maneuver; (ii) tilt tendency during a quasi-static drive through a curve; and, (iii) tilt tendency during a drive on a slope or when at standstill on a slope.

The driving state "tilt tendency during a dynamic driving maneuver" is classified as the most dangerous and the driving state "quasi-static circular travel" is classified as the second most dangerous driving state. The driving state "travel on the slope or standstill on the slope" is classified as the least dangerous driving state. The test criteria are assigned to the different driving states in accordance with this classification. These test criteria are continuously evaluated based on one or several driving parameters.

Here, it is always first checked whether the test criterion of the driving state "tilt tendency during a dynamic driving maneuver" is satisfied by the driving parameter(s). If this is not the case, the test criterion for the second most dangerous driving state is thereafter evaluated and then, the test criterion for the least dangerous driving state is evaluated.

The following can be detected as driving parameters for the detection of a driving state, for example: roll angle, roll angle velocity, transverse acceleration, yaw rate, steering angle and/or wheel contact forces. These driving parameters are all detected by corresponding sensors.

In accordance with a preferred embodiment of the invention, the roll angle is obtained by evaluating the signals of elevation sensors which measure the distance between a wheel axle and a vehicle body. The roll angle velocity can be determined from the roll angle in that, for example, the roll angle signal is filtered by two different lowpass filters and the filter outputs are subtracted from each other. When one of the filters is a filter having a long time constant, that is, a so-called long-time filter, and the other filter is a filter having a short time constant, that is, a short-time filter, the output signal is proportional to the roll angle velocity.

In accordance with a further preferred embodiment of the invention, a threshold value is assigned to a first driving state as a test criterion and a second threshold value is assigned to a second driving state as a test criterion. The first driving state is more dangerous than the second driving state and the first threshold value is so selected that it can already be reached without the second threshold value having to be exceeded, for example, the first threshold value is selected smaller than the second threshold value. With the selection of a smaller threshold value for the more dangerous driving state, the larger tilt tendency is, for example, considered in the more dangerous driving state in the test criteria.

According to a further embodiment of the invention, a warning signal is outputted when a driving state is detected. This can, for example, take place via a display device in the vehicle cockpit in order to correspondingly warn the driver. For example, the warning signal can be outputted as a visual signal or also as a touch-sensitive signal and/or an acoustic signal.

Alternatively, or additionally, a signal is outputted to a motor vehicle control system (open loop and/or closed loop) after detecting one of the driving states. This signal preferably indicates the detected driving state so that the control system can react in a correspondingly adapted manner. If, for example, a driving state with tilt tendency is detected, the tendency to tilt can be countered by an automatic braking and/or a steering intervention and/or additional measures. The control system which is applicable for the above, is especially an ABS, ESP, active steering adjustment and/or engine management system.

The application of the method of the invention is especially advantageous in vehicles having a high center of gravity such as small transport vehicles, vans or off-road vehicles because vehicles of this kind with a high center of gravity can tend to tilt during dynamic driving maneuvers, that is, with a sudden change of direction or during travel in a curve or circle. With the method of the invention, a tilt danger can be timely detected in order to rapidly take corresponding countermeasures such as a reduction of the engine torque, an additional brake torque and/or an adaptation of the damping characteristics.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
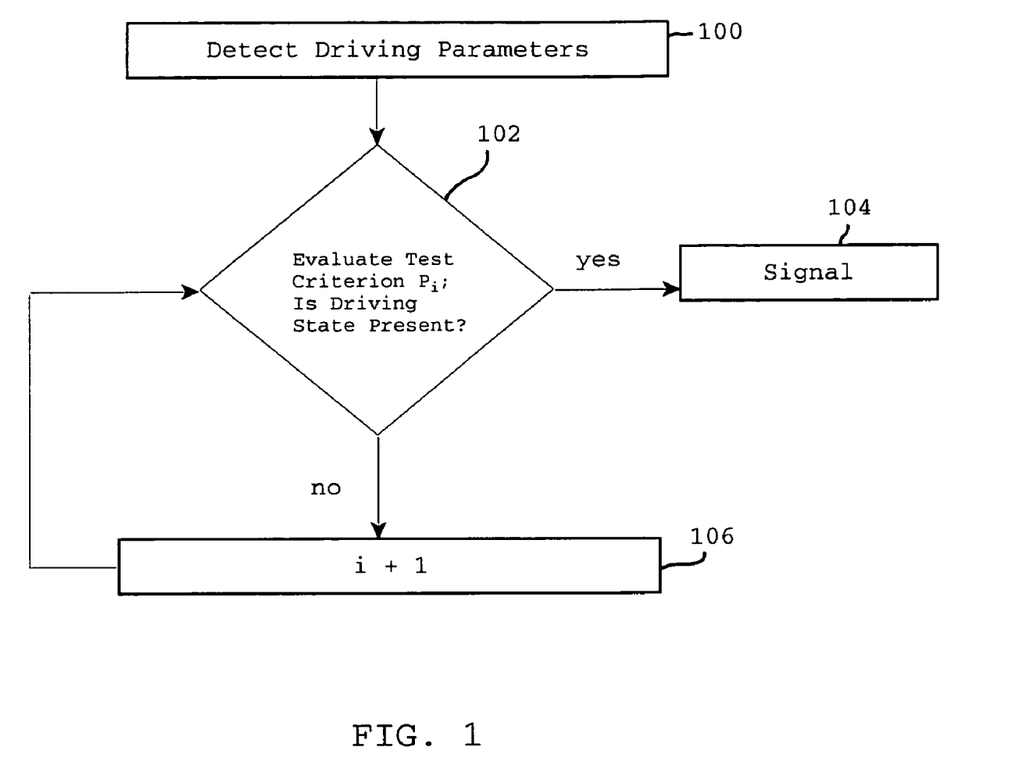
FIG. 1 is a flowchart showing an embodiment of the method of the invention for detecting driving states.

FIG. 1 shows a flowchart for detecting a driving state. In step 100, one or several driving parameters are detected. For example, the roll angle, the roll angle velocity, transverse acceleration, yaw rate, steering angle and/or the wheel contact forces of a vehicle are detected. In step 102, a check is made based on these driving parameters as to whether a driving state $F_i$ of a plurality of driving states $F=\{F_1, F_2, \ldots, F_N\}$ is present. A test criterion $P_i$ is assigned to each of these driving states of the plurality or quantity F. When a test criterion $P_i$ is satisfied by the detected driving parameters, this means that the driving state $F_i$ is present.

The driving states are classified with respect to their degree of danger and are correspondingly sorted. The most dangerous driving state is the driving state $F_1$ and the least dangerous driving state is the driving state $F_N$. The driving states $F_2$ to $F_{N-1}$, which lie between driving states $F_1$ and $F_N$, have a decreasing degree of danger in this sequence.

The check in step 102 takes place in the manner that first a check is made as to whether the most dangerous driving state $F_1$ is present in that the corresponding test criterion $P_1$ is evaluated by means of the driving parameters detected in step 100. If the test criterion $P_1$ is satisfied by the driving parameters, this means that the driving state $F_1$ is present. Thereupon, a signal is outputted in step 104.

The signal 104 can be a warning signal for the driver which, for example, is outputted via a display on the instrument panel of the motor vehicle.

If, in contrast, the check criterion $P_1$ is not satisfied, then the index (i) is incremented in step 106 in order to evaluate, in step 102, the test criterion $P_2$ for the less dangerous driving state $F_2$.

This sequence is carried out until either one of the driving states is detected and a signal has been outputted in step 104 or until it has been determined that none of the driving states from the quantity F is present.

It is especially advantageous that the check as to whether the most dangerous driving state $F_1$ is present is undertaken first because, for this case, the signal 104 is outputted correspondingly rapidly.

Preferably, the signal, which is outputted in step 104, includes an indication of the detected driving state. If, for example, the most dangerous driving state has been detected, then, simultaneously, a touch-sensitive warning signal and an acoustical warning signal for the driver are outputted. In a less dangerous driving state, for example, only an acoustic warning signal is outputted and for the least dangerous driving state, only a visual signal is outputted.

Alternatively, or in addition, the signal outputted in step 104 can be inputted to a control system (open loop and/closed loop) of the vehicle. This system can then react in correspondence to the detected driving state in order to reduce the danger. For example, an automatic braking can be undertaken in order to reduce the tilt tendency of the vehicle.

Figure 2:
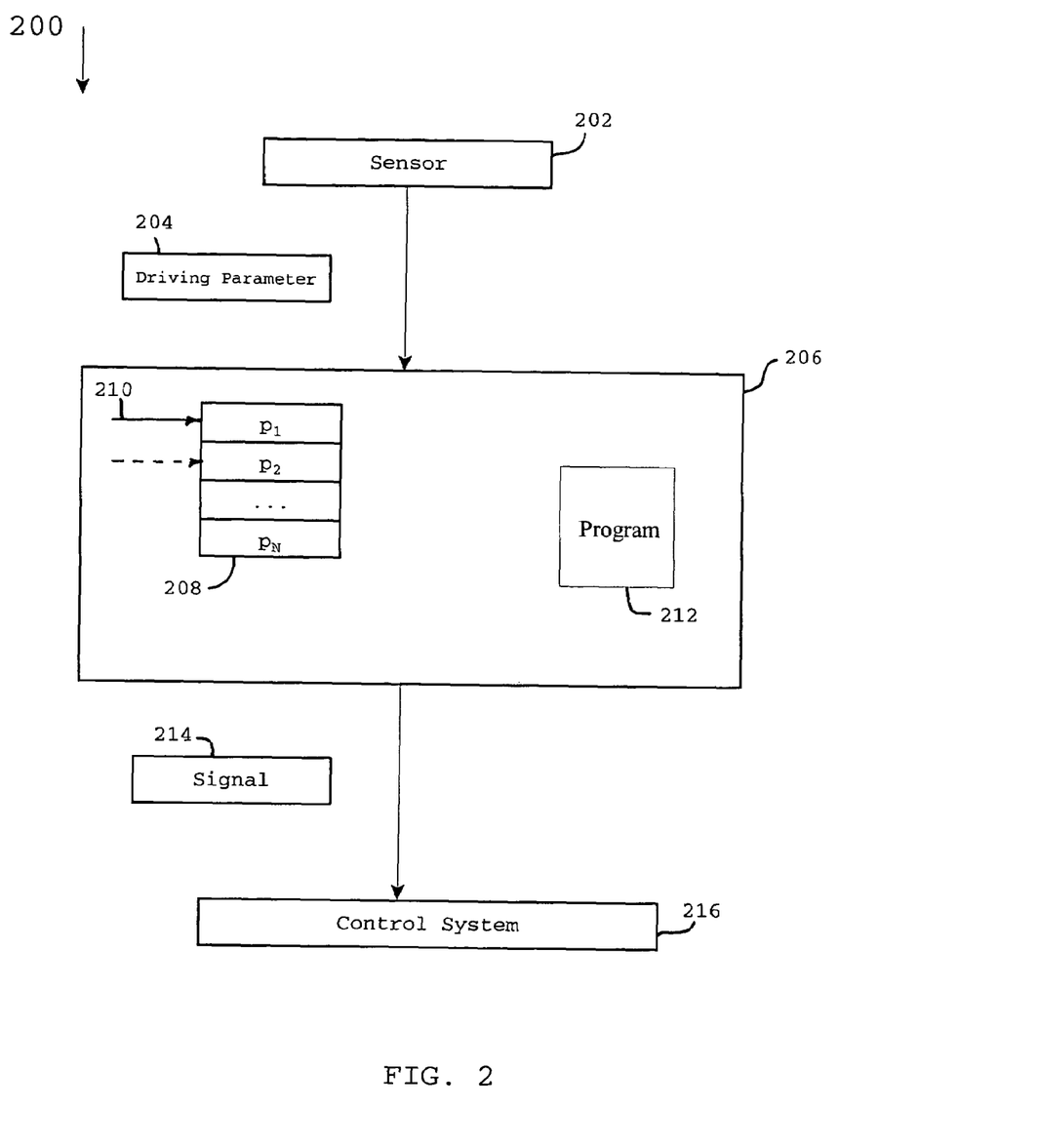
FIG. 2 is a block diagram of an arrangement of the invention for detecting driving states.

FIG. 2 shows a block diagram of a corresponding safety system 200. The safety system 200 has one or several sensors 202 for detecting one or several of the driving parameters 204 of a motor vehicle. The driving parameter(s) 204 are inputted to an evaluation module 206. The evaluation module 206 has a storage area 208 wherein the test criteria $P_1, P_2, \ldots, P_N$ are stored in this sequence. After the initialization of the safety system 200, an indicator 210 points to the address in the storage region 208 wherein the test criterion $P_1$ is stored for the most dangerous driving state $F_1$.

The evaluation module 206 further has a storage area 212 wherein a program is stored. The program in the storage area 212 functions to evaluate the test criteria $P_i$, which are stored in the memory area 208, with the aid of the driving parameters 204.

When one of the test criteria $P_i$ is satisfied by the driving parameters 204 (that is, the corresponding driving state $F_i$ has been detected), the program of the storage area 212 generates a corresponding signal 214 which is inputted into a drive dynamic control system (open loop and/or closed loop) of the vehicle. On the basis of the signal 214, the control system 216 can, for example, change a chassis parameter of the motor vehicle in order to, for example, reduce a tilt tendency of the vehicle. Alternatively, or additionally, a warning signal for the driver of the vehicle can be generated on the basis of the signal 214.

During operation, the sensor 202 continuously outputs driving parameters 204 which are continuously measured and/or detected by signal evaluation. The program 212 first checks whether the driving parameter(s) 204 satisfy the test criterion $P_1$. If this is the case, then the signal 214 is outputted. If the opposite is the case, then the indicator 210 is incremented so that it points to the adjacent address area in the memory 208 wherein the next test criterion $P_2$ is stored. This test criterion $P_2$ is then checked based on the driving parameters 204, et cetera.

Figure 3:
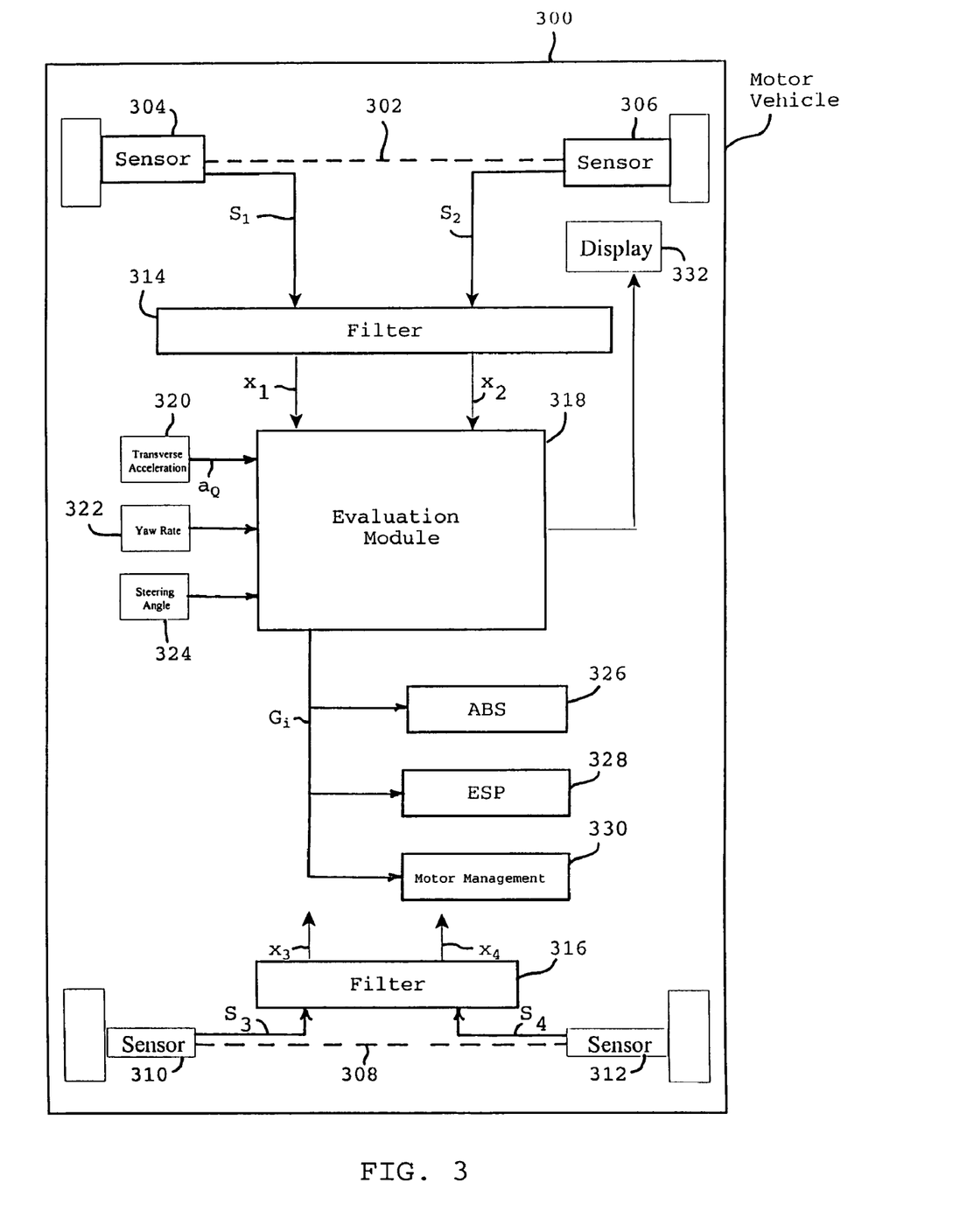
FIG. 3 is a schematic of a motor vehicle with a further embodiment of an arrangement for detecting driving states.

FIG. 3 is a schematic representation of a motor vehicle 300. The motor vehicle 300 has a sensor 304 at the left side of the forward axle 302 and a sensor 306 at the right side. Correspondingly, the motor vehicle 300 has a left sensor 310 at its rear axle 308 and a right sensor 312. For example, the sensors (304, 306) and (310, 312) can be elevation sensors which measure the distance of the particular axle from the chassis of the motor vehicle 300.

The signals $S_1$ and $S_2$ outputted by sensors 304 and 306, respectively, are inputted to filter module 314. With the aid of these signals $S_1$ and $S_2$, the filter module 314 generates the signals $x_1$ and $x_2$. The signal $x_1$ is, for example, proportional to a roll angle of the vehicle 300 at the forward axle 302 and the signal $x_2$ is proportional to the roll angle velocity at the forward axle 302.

Correspondingly, the signal $S_3$ and $S_4$ of sensors 310 and 312, respectively, are inputted to filter module 316 which outputs signals $x_3$ and $x_4$. For example, the signal $x_3$ is proportional to a roll angle at the rearward axle 308 and the signal $x_4$ is proportional to the roll angle velocity at the rearward axle 308.

The signals $x_1$, $x_2$, $x_3$ and $x_4$ are inputted to an evaluation module 318 which, in principle, is configured the same as the evaluation module 206 of FIG. 2.

Additionally, a sensor 320 can be provided for measuring a transverse acceleration of the motor vehicle 300. The sensor 320 outputs a signal $a_Q$, which is proportional to the measured transverse acceleration, into the evaluation module 318. Additionally, a sensor 322 can be provided for detecting a yaw rate, that is, the speed of rotation about the vertical axis of the vehicle. The yaw rates, which are determined by sensor 322, are inputted into the evaluation module 318 and can there be converted into transverse acceleration data based on a vehicle model.

Furthermore, a sensor 324 is provided for detecting a steering angle. The sensor 324 outputs a signal proportional to the steering angle to the evaluation module 318.

Based on the driving parameters (which are detected by the signals $x_1$, $x_2$ and/or $x_3$, $x_4$ and/or $a_Q$ and/or the output signal of the sensor 322 and/or of the sensor 324), the test criteria $P_1$, $P_2$, ..., $P_N$ are processed in sequence by the evaluation module 318 (compare driving parameters 204 of FIG. 2) as explained above with reference to FIGS. 1 and 2. When a driving state $F_i$ is detected by the evaluation module 318 because the corresponding test criterion $P_i$ was satisfied, the evaluation module 318 outputs a signal $G_i$ which indicates the detected driving state $F_i$.

The signal $G_i$ is, for example, inputted into an ABS system 326, an ESP system 328 and/or an engine management system 330. Alternatively or in addition, the signal $G_i$ can also be inputted into a system for adaptive chassis control which, for example, controls the damping characteristics of the motor vehicle 300 in dependence upon the signal $G_i$.

It is of special advantage here that the most dangerous driving state $F_1$ is detected the fastest by the evaluation module 318 so that the corresponding control systems (open loop and/or closed loop) can react correspondingly rapidly to the dangerous situation. The control system can, for example, be the ABS system 326 and/or the ESP system 328 and/or the engine management system 330.

Alternatively or in addition, a corresponding warning signal can be outputted via the display 332 in order to warn the driver of the vehicle 300.

Figure 4:
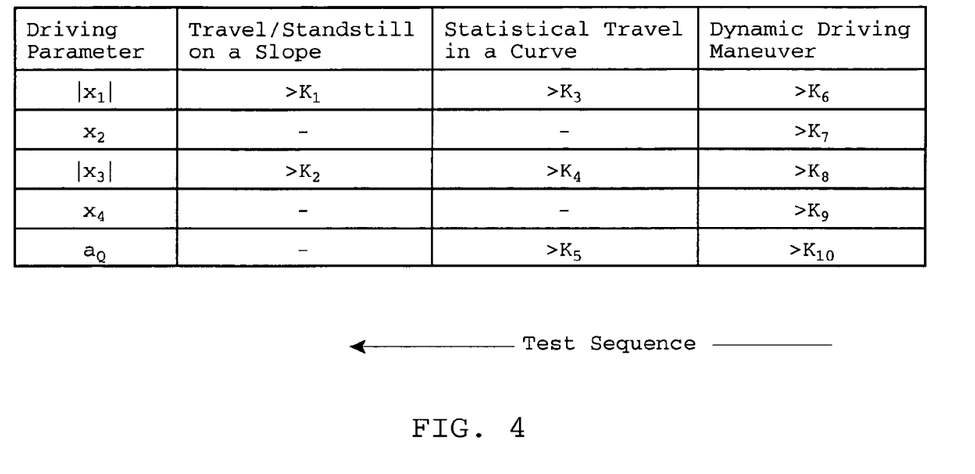
FIG. 4 is an embodiment of a decision matrix for the detection of driving states.

FIG. 4 shows, in tabular form, a decision matrix of the evaluation module 318. The decision matrix is, for example, formed in the program logic of the evaluation module 318 (see the program in storage area 212 of FIG. 2).

In the application of FIG. 4, three different driving states are distinguished:

$F_1$=tilt tendency for a dynamic driving maneuver;

$F_2$=tilt tendency for a quasi-static drive through a curve; and, $F_3$=tilt tendency when driving or at standstill on a slope.

The test criterion $P_1$ for the driving state $F_1$ is as follows.

The magnitude of the signal $x_1$ is greater than the threshold value $K_6$ and the signal $x_2$ is greater than the threshold value $K_7$ and the magnitude of the signal $x_3$ lies above the threshold value $K_8$ and the signal $x_4$ lies above the threshold value $K_9$ and the signal $a_Q$ lies above the threshold value $K_{10}$.

When all of these criteria for the driving parameters are satisfied, the test criterion $P_1$ is satisfied and the driving state $F_1$ is present.

The test criterion $P_2$ for the driving state $F_2$ is as follows.

The magnitude of the signal $x_1$ lies above the threshold value $K_3$ and the magnitude of the signal $x_3$ lies above the threshold value $K_4$ and the signal $a_Q$ lies above the threshold value $K_5$. The signals $x_2$ and $x_4$ are not involved in the test criterion $P_2$.

Since the driving state $F_2$ is less critical than the driving state $F_1$, the threshold values $K_3$, $K_4$ and $K_5$ can be selected greater than the corresponding threshold values $K_6$, $K_8$ and $K_{10}$.

The test criterion $P_3$ for the least dangerous driving state $F_3$ is as follows.

The magnitude of the signal $x_1$ lies above the threshold value $K_1$ and the magnitude of the signal $x_3$ lies above the threshold value $K_2$. Since the driving state $F_3$ is less critical than the driving state $F_2$, the threshold values $K_1$ and $K_2$ can, in turn, be selected above the corresponding threshold values $K_3$ and $K_4$; that is, $K_1 > K_3 > K_6$ and $K_2 > K_4 > K_8$ and furthermore, $K_5 > K_{10}$.

As soon as drive parameters are inputted, the test criterion $P_1$ is first evaluated by the evaluation module in order to check whether the driving state $F_1$ is present. If this is not the case, then the check of test criterion $P_2$ follows and if this too is not satisfied, the evaluation of test criterion $P_3$ finally takes place. From this, there results a check sequence with decreasing degrees of danger of the driving states. If, in this test sequence, one of the driving states $F_i$ is detected, then a corresponding signal $G_i$ is outputted as explained above with, inter alia, reference to FIG. 3.

Figure 5:
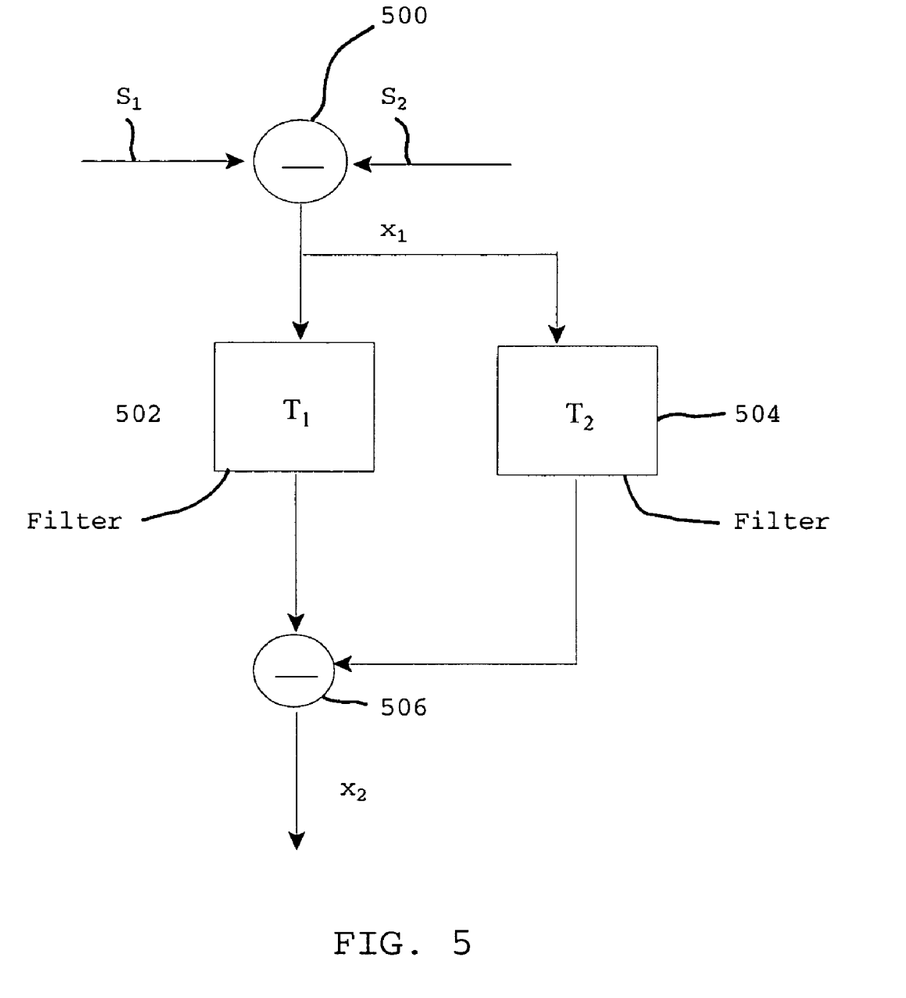
FIG. 5 is a filter device for determining a roll angle velocity signal.

FIG. 5 shows an example for the realization of the filter model 314. In this embodiment, the filter module includes a subtractor 500 which subtracts the signals $S_1$ and $S_2$ from each other. The result of this subtraction is the signal $x_1$ which is proportional to the roll angle at the forward axle 302 (see FIG. 3).

The signal $x_1$ is inputted to both filters 502 and 504. Filter 502 is a so-called long-time filter, that is, a lowpass having a relatively large time constant $T_1$; whereas, filter 504 is a so-called short-time filter, that is, a lowpass filter having a relatively short time constant $T_2$. For example, the time constant $T_1$ lies in the range of 1 second to 50 seconds and the time constant $T_2$ lies in the range of 10 to 100 milliseconds.

The output signals of the filters 502 and 504 are subtracted from each other by the subtractor 506 so that one obtains the signal $x_2$ which is approximately proportional to the roll angle velocity, that is, the derivative of the signal $x_1$.

Figure 6:
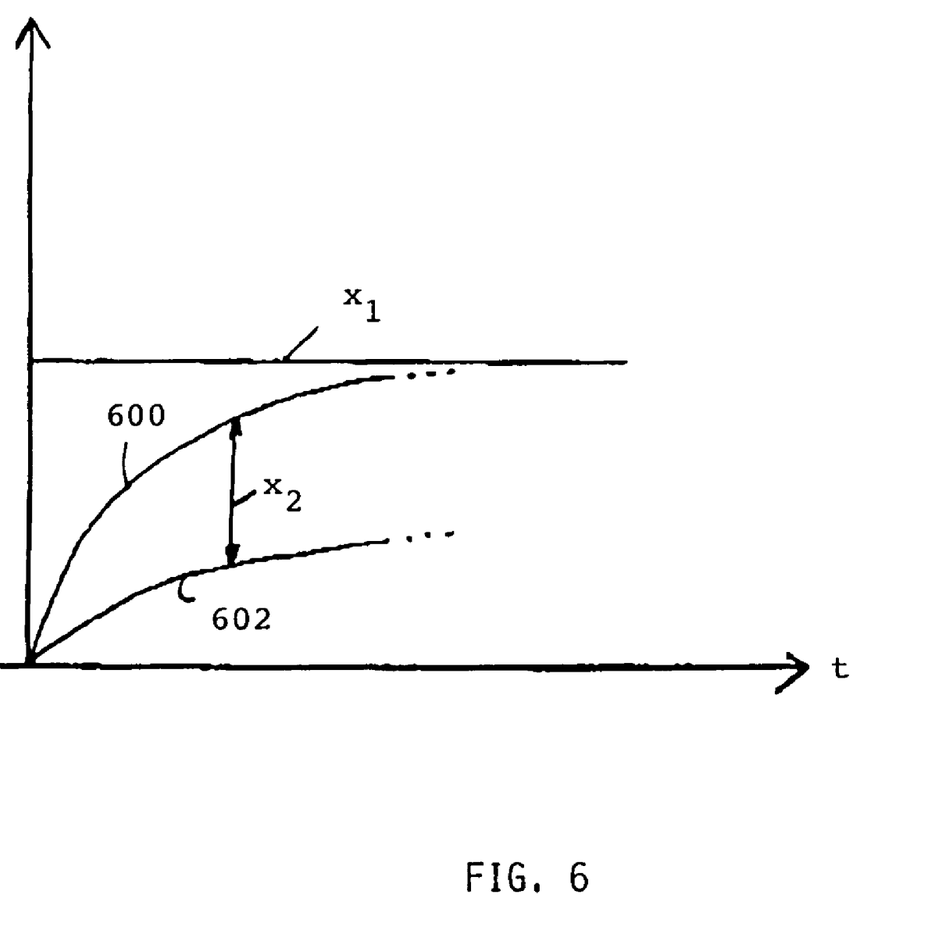
FIG. 6 shows the time-dependent course of signals for explaining the operation of the device of FIG. 5.

The operation of the embodiment of the filter module of FIG. 5 is shown in FIG. 6. FIG. 6 shows the time-dependent course of the signal $x_1$ as well as the signals 600 and 602. The signal 600 is the output signal of the filter 504 and the signal 602 is the output signal of the filter 502. The difference of these signals is the signal $x_2$ which is approximately the derivative of the signal $x_1$ because of the different time constants $T_1$ and $T_2$ of the filters 502 and 504.

It is understood that the foregoing description is that of the preferred embodiments of the invention and that various changes and modifications may be made thereto without departing from the spirit and scope of the invention as defined in the appended claims.

What is claimed is:

1. A method for determining a driving state from a plurality of driving states sorted in accordance with the degree of danger thereof, the method comprising the steps of:
allocating at least one test criterion for at least one driving parameter of a plurality of driving parameters to each of said driving states;
detecting at least one of said driving parameters; and,
based on said driving parameter, testing to determine if one of said driving states from said plurality of driving states is present by testing in a time sequence starting with the most dangerous of said driving states by evaluating the test criterion corresponding thereto.

2. The method of claim 1, wherein said plurality of driving states includes a first driving state with a tilt tendency during a dynamic maneuver and a second driving state with a tilt tendency during a quasi-static drive in a curve.

3. The method of claim 2, wherein said plurality of driving states includes a third driving state during travel along a slope or at standstill on a slope.

4. The method of claim 1, the method including the further step of detecting at least one of the following parameters: roll angle, roll angle velocity, transverse acceleration, yaw rate, wheel-contact force and steering angle.

5. The method of claim 1, wherein said plurality of driving states includes a first driving state to which a first threshold value is allocated as a test criterion; a second driving state to which a second threshold value is allocated as a test criterion; said first driving state is more dangerous than said second driving state; and, said first threshold value lies below said second threshold value.

6. The method of claim 1, wherein said driving parameter is a roll angle; and, wherein the method comprises the further step of determining said roll angle by evaluating signals of elevation sensors which measure the distance of a bodywork of a vehicle from a wheel axle.

7. The method of claim 6, wherein the method comprises the further step of determining the roll angle velocity as one of said parameters by filtering said roll angle through first and second filters of different time constants.

8. The method of claim 1, wherein the method comprises the further step of outputting a warning signal when one of said driving states is determined.

9. The method of claim 8, wherein said warning signal includes at least one of the following: a touch-sensitive signal; an acoustic signal; and, a visual signal.

10. The method of claim 1, wherein the method includes the further step of outputting a signal to a vehicle control system after determining one of said driving states.

11. A digital storage medium comprising: program means for determining a driving state from a plurality of driving states sorted in accordance with the degree of danger thereof with at least one test criterion for at least one parameter of a plurality of driving parameters being allocated to each of said driving states; and, said program means being configured to perform the method steps of:
inputting at least one of said parameters; and,
based on said driving parameter, testing to determine if one of said driving states from said plurality of driving states is present by testing in a time sequence starting with the most dangerous of said driving states by evaluating the test criterion corresponding thereto.

12. The arrangement of claim 11, wherein the following are stored in said memory: a first threshold value as a first test criterion for a first driving state and a second threshold value as a second test criterion for a second driving state; said first driving state having a higher degree of danger than said second driving state; and, said first threshold value lying below said second threshold value.

13. The arrangement of claim 11, further comprising elevation sensors for measuring at least two distances between a wheel axle and a vehicle bodywork to determine a roll angle as one of said parameters.

14. The arrangement of claim 13, further comprising first and second filters for determining a roll angle velocity from said roll angle; and, said first filter having a time constant greater than the time constant of said second filter.

15. The arrangement of claim 11, further comprising means for outputting a warning signal.

16. The arrangement of claim 15, wherein said warning signal includes at least one of the following: a touch-sensitive signal; an acoustic signal; and, a visual signal.

17. The arrangement of claim 15, wherein said signal includes an indication of the determined driving state.

18. The arrangement of claim 11, further comprising means for a signal to a vehicle control system after determining one of said driving states.

19. An arrangement for determining a driving state from a plurality of driving states, the arrangement comprising:
a memory for storing at least one test criterion for each of said driving states;
means for detecting at least one driving parameter; and,
means for testing, based on said driving parameter, to determine if one of said driving states from said plurality of driving states is present by testing in a time sequence starting with the most dangerous of said driving states by evaluating the test criterion corresponding thereto.

20. The arrangement of claim 19, further comprising means for detecting at least one of the following parameters: roll angle, roll angle velocity, transverse acceleration, yaw rate, wheel-contact force and steering angle.

* * * * *